US010631458B2

(12) United States Patent
Morabit

(10) Patent No.: US 10,631,458 B2
(45) Date of Patent: Apr. 28, 2020

(54) MULTI-ZONE CUTTER ELEMENTS FOR GRASS TRIMMERS, ROTARY MOWING, AND OTHER HEAVY VEGETATION CUTTING APPLICATIONS

(71) Applicant: Aero-Flex Technologies, Inc., Rock Hill, SC (US)

(72) Inventor: Vincent D. Morabit, Rock Hill, SC (US)

(73) Assignee: AERO-FLEX TECHNOLOGIES, INC., Rock Hill, SC (US)

( * ) Notice: Subject to any disclaimer, the term of this patent is extended or adjusted under 35 U.S.C. 154(b) by 0 days.

(21) Appl. No.: 15/858,113

(22) Filed: Dec. 29, 2017

(65) Prior Publication Data

US 2018/0184588 A1   Jul. 5, 2018

Related U.S. Application Data

(60) Provisional application No. 62/440,166, filed on Dec. 29, 2016.

(51) Int. Cl.
  *A01D 34/416*   (2006.01)

(52) U.S. Cl.
  CPC ..... *A01D 34/4168* (2013.01); *A01D 34/4166* (2013.01)

(58) Field of Classification Search
  CPC .......................................... A01D 34/416–4168
  USPC ............................. 30/276; D8/8; 56/12.7, 17
  See application file for complete search history.

(56) References Cited

U.S. PATENT DOCUMENTS

| | | | | |
|---|---|---|---|---|
| 2,851,028 A | * | 9/1958 | Asbury | A01D 34/4166 125/5 |
| 4,054,993 A | * | 10/1977 | Kamp | A01D 34/4168 30/276 |
| 4,065,913 A | * | 1/1978 | Fisher | A01D 34/4166 56/12.7 |
| 4,086,700 A | * | 5/1978 | Inada | A01D 34/4166 30/276 |
| 4,126,991 A | * | 11/1978 | Gobin | A01D 34/4168 56/12.7 |
| 4,165,597 A | * | 8/1979 | Scanland | A01D 34/4168 56/295 |

(Continued)

FOREIGN PATENT DOCUMENTS

WO  WO 99/40773  8/1999

OTHER PUBLICATIONS

Extended European Search Report dated Oct. 12, 2018 issued in European Patent Application No. 17211153.6, 9 pp.

*Primary Examiner* — Jason Daniel Prone
(74) *Attorney, Agent, or Firm* — Nixon & Vanderhye P.C.

(57) ABSTRACT

A line blade for a rotating trimmer includes a loading section securable for rotation on a cutting plane with a head of the rotating trimmer. A living hinge extends from the loading section. A transition section extends from the living hinge and has a first cross-sectional shape. The first cross-sectional shape is configured and oriented to reduce drag. A cutting segment extending from the transition section has a second cross-sectional shape that is different from the first cross-sectional shape of the transition section, where the second cross-sectional shape is configured and oriented for cutting vegetation. The multi-zone line blade improves cutting at lower speeds, thereby requiring less power.

16 Claims, 9 Drawing Sheets

(56) References Cited

U.S. PATENT DOCUMENTS

| | | | |
|---|---|---|---|
| 4,186,239 A * | 1/1980 | Mize | A01D 34/4168 30/276 |
| 4,461,138 A * | 7/1984 | Whitman | A01D 34/4166 56/12.7 |
| 4,825,627 A * | 5/1989 | Truderung | A01D 34/4168 30/276 |
| 4,869,055 A * | 9/1989 | Mickelson | A01D 34/4168 56/12.7 |
| 5,220,774 A * | 6/1993 | Harbeke | A01D 34/4168 30/276 |
| 5,424,128 A * | 6/1995 | Fogle | A01D 34/4168 30/276 |
| 5,463,815 A * | 11/1995 | Fogle | A01D 34/4168 30/276 |
| 5,687,482 A * | 11/1997 | Behrendt | A01D 34/4168 30/276 |
| 5,761,816 A * | 6/1998 | Morabit | A01D 34/4168 30/276 |
| 5,907,947 A * | 6/1999 | Poole | A01D 34/736 56/12.7 |
| 5,996,233 A * | 12/1999 | Morabit | A01D 34/4168 30/276 |
| 6,045,911 A * | 4/2000 | Legrand | A01D 34/4168 30/276 |
| 6,061,914 A * | 5/2000 | Legrand | A01D 34/4168 30/347 |
| 6,122,832 A * | 9/2000 | Lee | A01D 34/4168 30/276 |
| 6,124,034 A * | 9/2000 | Proulx | A01D 34/4168 30/276 |
| RE36,940 E * | 11/2000 | Fogle | A01D 34/4168 30/276 |
| 6,161,292 A * | 12/2000 | Morabit | A01D 34/4168 30/276 |
| 6,176,015 B1 * | 1/2001 | Morabit | A01D 34/4168 30/276 |
| 6,314,848 B2 * | 11/2001 | Morabit | A01D 34/4168 30/276 |
| 6,415,585 B2 * | 7/2002 | Morabit | A01D 34/416 30/276 |
| 6,434,837 B1 * | 8/2002 | Fogle | A01D 34/4168 30/276 |
| 6,455,155 B1 * | 9/2002 | Walsh | A01D 34/4168 428/364 |
| 6,560,878 B2 * | 5/2003 | Skinner | A01D 34/4168 30/276 |
| 6,643,938 B2 * | 11/2003 | Livingston | A01D 34/4166 30/276 |
| 6,668,462 B2 * | 12/2003 | Skinner | A01D 34/4168 30/276 |
| 6,842,984 B1 * | 1/2005 | Grant | A01D 34/4168 30/276 |
| 6,874,235 B1 * | 4/2005 | Legrand | A01D 34/4168 30/276 |
| 6,910,277 B2 * | 6/2005 | Proulx | A01D 34/4168 30/276 |
| 7,210,231 B2 * | 5/2007 | Legrand | A01D 34/4168 30/276 |
| 7,370,424 B2 * | 5/2008 | Legrand | A01D 34/4168 30/276 |
| 7,607,233 B2 * | 10/2009 | Legrand | A01D 34/4168 30/276 |
| 7,829,002 B2 * | 11/2010 | Legrand | A01D 34/4168 264/210.2 |
| 7,913,401 B2 * | 3/2011 | Iacona | A01D 34/4168 30/276 |
| 8,061,042 B2 * | 11/2011 | Arnetoli | A01D 34/4166 30/276 |
| 8,096,216 B2 * | 1/2012 | Piccolo | A01D 34/4168 30/276 |
| 8,341,847 B2 * | 1/2013 | Kato | A01D 34/416 30/276 |
| 8,769,831 B2 * | 7/2014 | Duvall | A01D 34/4166 30/276 |
| 8,925,206 B2 * | 1/2015 | Cigarini | A01D 34/733 30/276 |
| 9,414,540 B2 | 8/2016 | Morabit | |
| 9,474,205 B2 * | 10/2016 | Morabit | A01D 34/416 |
| 9,872,430 B2 * | 1/2018 | Morabit | A01D 34/4165 |
| 9,883,628 B2 * | 2/2018 | Morabit | A01D 34/4165 |
| 2005/0172501 A1 * | 8/2005 | Fogle | A01D 34/4168 30/276 |
| 2006/0254062 A1 * | 11/2006 | Fogle | A01D 34/4168 30/276 |
| 2007/0028459 A1 * | 2/2007 | Thomson | A01D 34/4168 30/276 |
| 2007/0256309 A1 * | 11/2007 | Fogle | A01D 34/4168 30/276 |
| 2010/0101099 A1 | 4/2010 | Morabit | |
| 2011/0033703 A1 * | 2/2011 | Legrand | A01D 34/4168 428/394 |
| 2011/0056083 A1 * | 3/2011 | Wang | A01D 34/4168 30/345 |
| 2012/0208021 A1 * | 8/2012 | Yang | A01D 34/4168 428/400 |
| 2014/0338202 A1 * | 11/2014 | Morabit | A01D 34/902 30/275.4 |
| 2015/0245558 A1 * | 9/2015 | Morabit | A01D 34/4165 30/276 |
| 2015/0271993 A1 * | 10/2015 | Legrand | B29C 48/05 30/276 |
| 2015/0342117 A1 * | 12/2015 | Alliss | A01D 34/4168 30/276 |
| 2016/0007528 A1 * | 1/2016 | Skinner | A01D 34/4168 30/276 |
| 2016/0016322 A1 * | 1/2016 | Islam | B26B 21/56 30/276 |
| 2016/0029556 A1 * | 2/2016 | Legrand | A01D 34/4168 30/276 |
| 2016/0044864 A1 * | 2/2016 | Hermann | A01D 34/4166 30/276 |
| 2016/0143220 A1 * | 5/2016 | Child | A01D 34/4166 30/276 |

* cited by examiner

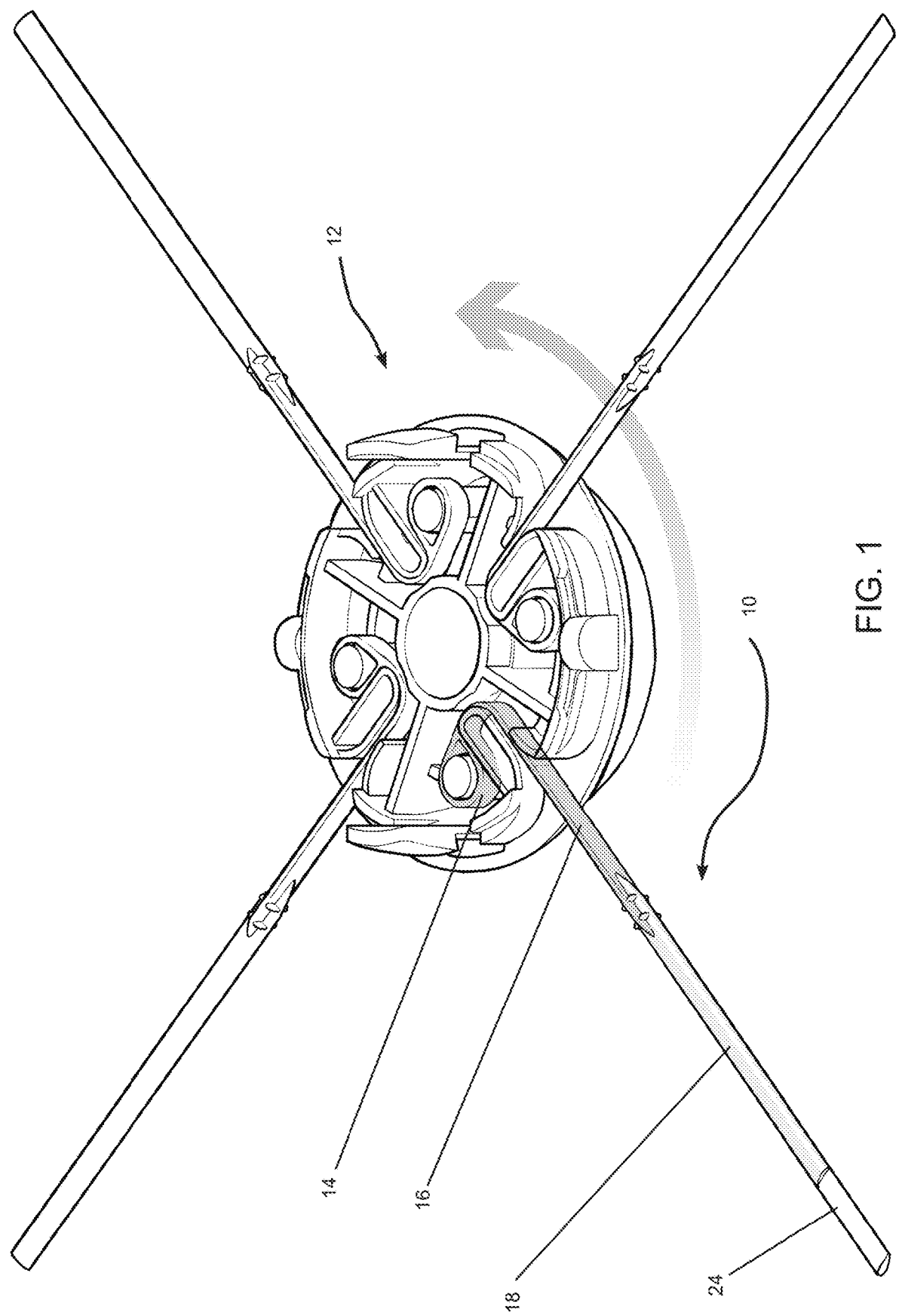

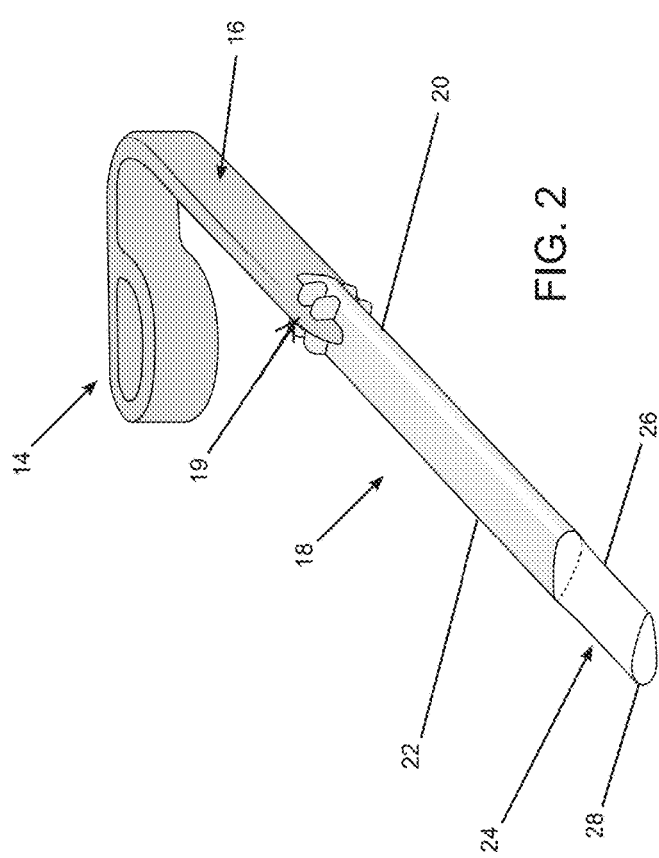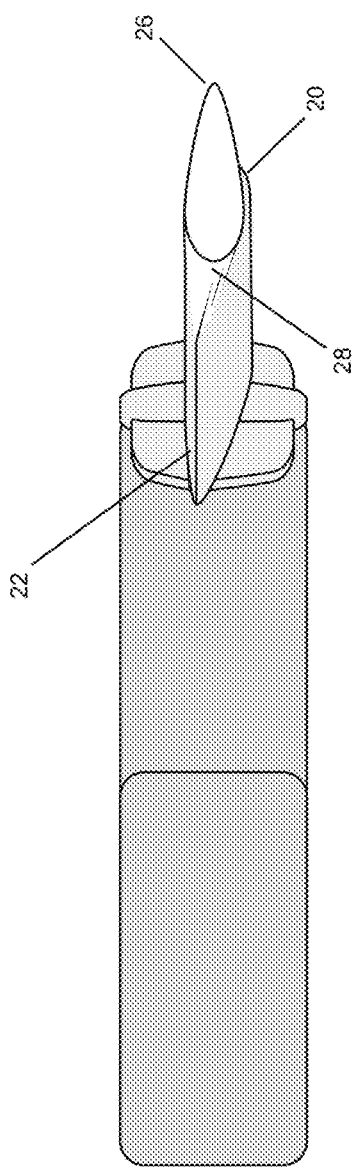

Method to Measure and Calculate 'Cd.t' Product and Design Guide

After Dynamometer Measurement of Torque: Calculate Cd.t, Watts, HP

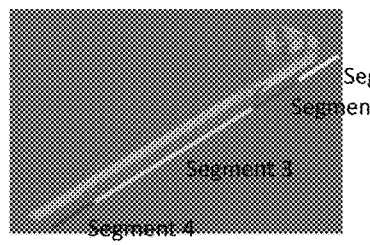

Segment 1
Segment 2
Segment 3
Segment 4

$\Sigma T_{drag} = T_{drag2} + T_{drag3} + T_{drag4}$

Derivation of Cd.t product from drag equation:

$$F_{drag} = Cd \frac{\rho}{g} A_{proj} \frac{v^2}{2}$$

w/ $v = \omega r$, $T_{drag} = F_{drag} * r$, & $A = t\,dr$ so for a segment defined by start & end radii, $$T_{drag} = Cd \frac{\rho}{2g} \omega^2 t \int_{start\ radius}^{end\ radius} r^3 dr$$

Integrate to obtain:

$$T_{drag} = Cd \frac{\rho}{2g} \omega^2 \frac{t}{4} r^4 \Big|_{start\ radius}^{end\ radius}$$

Rearrange for Cd.t product:

$$Cd * t = \frac{8Tg}{\rho \omega^2 r^4 \Big|_{start\ radius}^{end\ radius}}$$

$$Horsepower = T_{drag} * \frac{RPM}{5252}$$

$$Wattage = Horsepower * 745.7$$

FIG. 6

FIELD POWER MEASUREMENTS – CUTTING

| TRIMMER | VOLTAGE | # LINES | RPM | SWATH DIA. | TIP SPEED FT/MIN | CUTTING WATTS | WATTS SAVED | % SAVED |
|---|---|---|---|---|---|---|---|---|
| A | 20V | 2(.080") | 5900 | 13" | 20,400 | 465 | | |
| A | 20V | 4(H3Hybrid) | 4600 | 14" | 16800 | 227 | 238 | 51% |
| B | 40V | 2 (.080") | 5070 | 15" | 19600 | 403 | | |
| B | 40V | 4(H3Hybrid) | 5070 | 14" | 18600 | 275 | 158 | 32% |
| B | 40V | 4(H3Hybrid) | 4600 | 14" | 16800 | 227 | 176 | 44% |
| C | 60V | 2 (.095") | 5700 | 16" | 24100 | 755 | | |
| C | 60V | 4(H3Hybrid) | 4600 | 14" | 16800 | 250 | 503 | 66% |
| D low | 60V | 2 (.080") | 6130 | 16" | 25700 | 534 | | |
| D high | 60V | 2 (.080") | 6820 | 16" | 28570 | 613 | | |
| D 4600rpm | 60V | 4(H3Hybrid) | 4600 | 14" | 16800 | 250 | L 284W<br>H 363W | 53%<br>59% |

FIG. 8

POWER CONSUMPTION (Small 20V trimmer)

|  | 2 Mono .080" at 5900 rpm | 4 Aero H3 at 4600 rpm |
|---|---|---|
| Flat Edging | 350W | 380W (close to ground) |
| Vertical Edging | 357W | 470W (hard press) |
| Cutting Grass | 472W | 245W (elevated with glider) |
| Trimming 1" | 400-550W | 500W (head on ground) |
| Trimming 2" | hard to hold | 250W (elevated with glider) |
| Bumping* | 300-500 W | 0 Watts (no need for Bump replenishment) |

*Variables

FIG. 9

MULTI-ZONE CUTTER ELEMENTS FOR GRASS TRIMMERS, ROTARY MOWING, AND OTHER HEAVY VEGETATION CUTTING APPLICATIONS

CROSS-REFERENCES TO RELATED APPLICATIONS

This application claims the benefit of U.S. Provisional Patent Application No. 62/440,166, filed Dec. 29, 2016, the entire content of which is herein incorporated by reference.

STATEMENT REGARDING FEDERALLY SPONSORED RESEARCH OR DEVELOPMENT (NOT APPLICABLE)

BACKGROUND

The invention relates to line blades for a rotating trimmer and, more particularly, to a multi-zone line blade with improved aerodynamic, stability and cutting capabilities.

Monofilament line, commonly used with all battery trimmers and most gas trimmers, is inherently inefficient and weak due to (1) excessive power drag inefficiencies, (2) limited and poor cutting quality and performance, which requires higher speed cutting, (3) excessive wear and failure rates needing constant replenishment from unreliable bump systems, and (4) limited ability to cut bigger vegetation. Monofilament line is by nature over-stressed, and its complex and unreliable feeding systems are designed to compensate for these well-known and continuing monofilament line failures. Users are highly frustrated with monofilament line and feed (bump) systems because of their inherent respooling and jamming complexities. Further disappointment ensues with the performance of cordless (battery-powered) trimmers, as grass cutting quantity and quality with monofilament line are inferior, and most often, do not meet users' job needs in cutting time due to limited battery life. Battery powered attempts do not have an adequate charge and do not run long enough to finish the workload. Further, battery life is limited, they are heavy creating user fatigue, and they are costly to replace.

The current state of the art for flexible line blades provides a major reliability and cutting improvements over monofilament line, particularly regarding its better ability to cut at much lower speeds while being more adequately designed to withstand normally high impact forces without the harassing failures of monofilament lines. Further and more importantly, the line blade orientation can be pitched to create lift-induced updraft that assists with grass lift in the rotary mowing process. While a major improvement in so many areas, there are numerous tradeoff problems with existing line blades associated with high drag, flapping, twist resonance, and other grass cutting characteristics.

Current line blade designs incorporate three basic segment/zones of different shapes and configurations, each serving individual operational performance and function. The blade segment may carry a sharp leading edge from the hinge to the cutting tip. This inherently produces a vulnerability to aerodynamic and aeroelastic forces that dramatically change how the blade interacts with related active forces, thus making it susceptible to instability. The three-segment line blades, such as the line blades available from Aero-Flex Technologies in Rock Hill, S.C., are growing in acceptance and are beneficial for gas trimmers. The existing line blades, however, are not yet fully practical for cordless trimmers because adequate battery charge storage technology is currently limited, making such trimmers 'power starved,' and in order for the current line blades to cut with a leading sharper edge, which has been found desirable through testing and experimentation, an elevated drag further reduces battery life. While cutting on the blunt side of the aerodynamically-shaped cross-section flexible line blades is still superior to using a monofilament line, the added benefits of cutting with the sharper side of the cross-sectional shape are significant.

Cordless trimmers are far from being competitive with gas trimmers. High energy concentration of gasoline in relatively large fuel tanks enables gas trimmers to allow wasted energy. As long as there is ample fuel available, gas trimmers are not subject to energy limitations, and because refilling the fuel tank is a short process. On the other hand, cordless trimmers' use time is capped due to the very limited supply of energy stored in batteries, which can take hours to recharge, effectively rendering the tool useless until recharged. While battery technology is improving, it falls far short of gasoline energy. For example, it takes at least ten (10) 120 watt-hour batteries to equate the energy in one pint of gasoline, generally about a tank in a gas trimmer. Therefore, so that user run time can be maximized, inefficient use of energy in cordless trimmers needs to be minimized and this includes the high drag penalties of cutting with conventional monofilament line or inefficient and unstable line blades. While cordless trimmers are an attraction over gas trimmers (no gas, no smoke, low noise, no cranking, etc.), current user dissatisfaction from poor performance from monofilament line further implies an inferior or lower value product to the user.

While the existing flexible line blades from Aero-Flex Technologies will improve trimming well beyond monofilament line, there still remains negatives to be resolved by the line blades of the described embodiments. There is a need to enable more cordless trimmer options toward better cutting rates, greater area cut per battery charge, and higher feed speed options for more aggressive trimming line blade flutter, a current disadvantage, is due to complex interaction of aerodynamic and torsional forces acting at different order harmonics. Flutter is a flapping of the blade better described as similar to a bird's wing flapping. It severely interferes with cutting vegetation, especially when assisted with a glider support disc during mowing with flexible line blades. Flutter also creates aggressive impact of the blades to the grass to prevent an even height or level cut. Flutter also creates unequal wear between the line blades, creating more vibratory effects on the trimmer head and on the user.

Added noise from sharp leading edges with existing line blades is generated from harmonic resonance conditions due to complex dynamic and interactive forces such as generated by turbulence, air bending forces, line blade structure, material torsional resistance, and centrifugal forces. These unstable harmonic twists are due to the complex interaction of aerodynamic and centrifugal forces further complicated by the line blade torsional response (like a torsional spring). This has been observed with a strobe light together with dynamometer testing, as well as a study of high speed camera viewing. Close examination shows that (but occurring less when cutting into vegetation) pitch angle cycles dynamically between positive and negative twisting due to complex differentiating operational forces on the blade further influenced by torsional cycling. These reactions increase drag and energy losses. When free spinning (but less occurring when into cutting into vegetation), these added dynamic deficiencies create an undesirable and irritating noise at elevated pitch levels. Heavy amperage overloading also occurs to cause current 'spiking,' a premature circuit breaker overload activation shutting down motor operation. All these negatives severely hinder the current state of the art of line blade usage for cordless trimmers.

BRIEF SUMMARY

The improvements to the flexible line blade cutting system offered with the line blades according to the described embodiments will make both gas and electric grass trimmers more useful, energy-efficient, and productive cutting performers characterized by improved lower cost economies, and better ergonomics during use all adding to greater value.

The invention provides for a multi-zone segment flexible line blade cutter geometry specially arranged to create lower drag forces, an updraft air and sharp leading cutter edges for better cutting ('Aero-Sharp'), reduced flapping and twisting resonance, all leading to more efficient performing grass trimmers, rotary mowers, and other heavy vegetation cutting applications.

Each zone of the multi-zone blades will have a range of specific geometries to be established by further development and tweaking to properly match the specific trimmer model with respect to its drive motor and other related systems.

While cutting with the blunt side of an aerodynamic line blade is better than cutting with monofilament round cutting line (somewhat sharper, more mass, and more structural), the objective features of the described embodiments enable cutting with sharp leading edges of the airfoil shaped flexible line blades (the reverse side of the airfoil). The blade design according to the described embodiments emphasizes the objectives of achieving the benefits of a cutting segment with a leading sharper edge and overcomes the drawbacks associated with existing line blades. Within a given lower speed range where conventional line blades are normally unstable, the design also achieves a substantial reduction in air drag, creates an updraft that helps cutting grass, eliminates the impediments of 'flapping' (like a gull-wing action), and reduces the annoying high pitch noise and associated power loss from vibratory blade 'twisting' resonance.

In an exemplary embodiment, a line blade for a rotating trimmer includes a loading section securable for rotation on a cutting plane with a head of the rotating trimmer. A living hinge extends from the loading section. A transition section extending from the living hinge and having a first cross-sectional shape is oriented such that a height of the transition section is less than a width of the transition section relative to the cutting plane. A cutting segment extending from the transition section has a second cross-sectional shape that is different from the first cross-sectional shape of the transition section.

Respective geometries of the living hinge, the transition section, and the cutting segment may be configured to match characteristics of the rotating trimmer A cross-section of the line blade may transition from an upright profile of the living hinge relative to the cutting plane to a sharp cutting edge of the cutting segment.

The transition section may include an aerodynamic cross-section with a blunt leading edge and a sharper trailing edge. In this context, the cutting segment may include a sharp leading cutting edge. The cutting segment may be 0.5-1.5" in length or about 1" in length. The transition section may be provided with a greater mass than the cutting segment. The aerodynamic cross-section may be pitched to create an updraft when the line blade is rotated by the rotating trimmer A change in cross-sectional shape between the first cross-sectional shape and the second cross-sectional shape may be parabolic or linear.

In another exemplary embodiment, a line blade for a rotating trimmer includes the loading section securable for rotation on a cutting plane with a head of the rotating trimmer A living hinge extends from the loading section, and a transition section extends from the living hinge and has a first cross-sectional shape. The first cross-sectional shape is configured and oriented to reduce drag. A cutting segment extending from the transition section has a second cross-sectional shape that is different from the first cross-sectional shape of the transition section, where the second cross-sectional shape is configured and oriented for cutting vegetation.

In yet another exemplary embodiment, a line blade for a rotating trimmer includes a loading section securable for rotation on a cutting plane with a head of the rotating trimmer and at least three distinct sections extending from the loading section, where each of the at least three distinct sections has a different cross section.

BRIEF DESCRIPTION OF THE DRAWINGS

These and other aspects and advantages will be described in detail with reference to the accompanying drawings, in which:

FIG. 1 shows the multi-zone line blades of the described embodiments installed in a trimmer cap system attachable to a rotating trimmer head;

FIGS. 2 and 3 are perspective views of the line blade and define an upright profile/orientation;

FIG. 6 shows drag calculations for line blades;

FIG. 8 shows field performance measurements on four different cordless trimmers (A, B, C and D); and FIG. 9 shows field wattage data measured with a small 20V cordless trimmer for different types of trimming and mowing cuts, and when cutting at different levels of grass heights.

DETAILED DESCRIPTION

Figure 4:
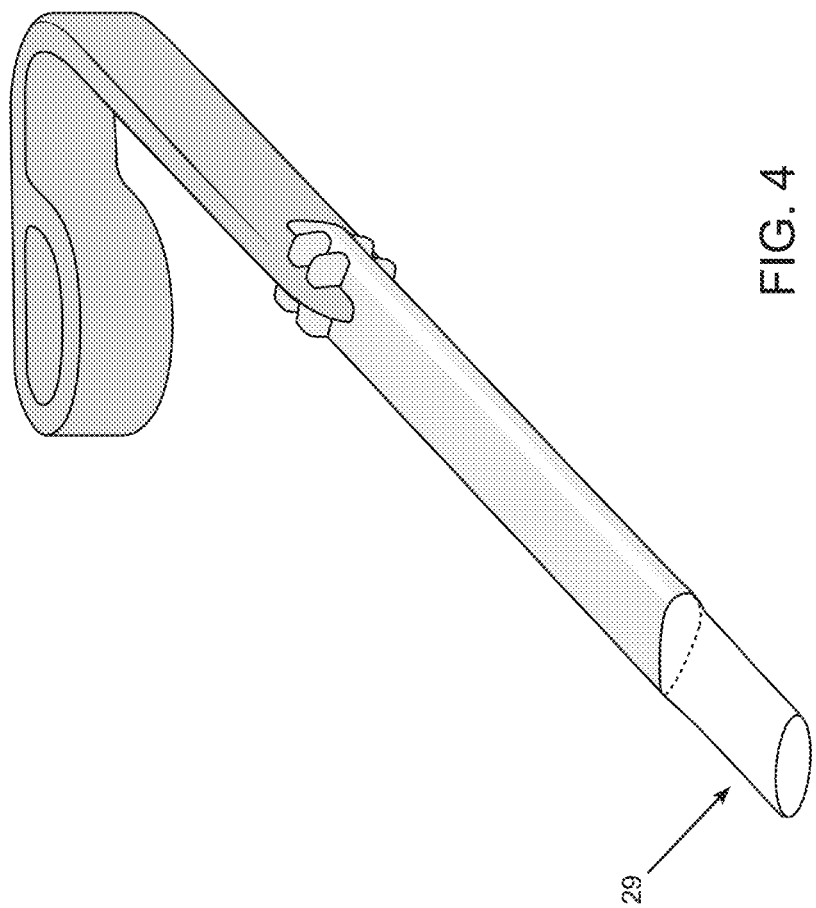
FIG. 4 shows the line blade including a cutting segment with a cross-section in the shape of an ellipse.

With reference to the drawings, a line blade 10 is securable in a cap 12 or the like for rotation on a cutting plane with a head of a rotating trimmer. The cap 12 may form part of the head or may be attachable to an existing trimmer head.

The line blade 10 includes a loading section 14 that is securable to the head or cap 12 of a rotating trimmer. The loading section 14 may comprise any suitable construction for connecting the blade 10 to the cap/head 12. The exemplary loading section 14 shown in FIG. 1 is described in U.S. Pat. No. 9,474,205, the contents of which are hereby incorporated by reference.

A living hinge 16 extends from the loading section 14. The living hinge 16 is flexible to accommodate operating parameters of the line blade 10 and rotating head. The amount of flex in the flexible living hinge 16 is variable according to many factors, including, for example, swath diameter, hinge thickness, hinge length, material flex modulus, blade mass, tip speed, centrifugal forces, rotational inertia and more. As shown, the living hinge 16 exits the cap 12 in a generally upright orientation. That is, relative to the cutting plane, a height of the living hinge is greater than its width or thickness. As such, the upright orientation of the living hinge 16 is detrimental to air and grass drag during use, and a length of the living hinge 16 may thus be minimized to minimize drag during use.

A transition section 18 extends from the living hinge 16. The structural and supporting ridges/ribs 19 in the area between the living hinge 16 and the transition section 18 are formed in the mold during the manufacturing process to help maintain the essentially 90° turn in orientation between the living hinge 16 and the transition section 18. The transition section 18 spans a majority of the length of the line blade 10. In some embodiments, the transition section 18 is provided with an aerodynamic shape in cross-section. For example, with reference to FIGS. 2 and 3, the transition section 18 may be provided with a teardrop cross-sectional shape. To minimize air drag, the cross-sectional shape is oriented with a blunt side leading edge 20 and a less blunt or sharp trailing edge 22. Of course, other aerodynamic cross-sectional shapes may also be utilized. Broadly, the transition section 18 is oriented perpendicular or beyond perpendicular to the living hinge 16. That is, a height of the transition section 18 is less than a width of the transition section 18 relative to the cutting plane.

A cutting segment 24 extends from the transition section 18. In some embodiments, the cutting segment 24 is provided with a cross-sectional shape that is different from the cross-sectional shape of the transition section 18. A "different" cross-sectional shape as defined herein may encompass the same shape but in a different orientation or size, thereby being subjected to different aerodynamic characteristics. As shown in FIGS. 2 and 3, for example, the cutting segment 24 may be provided with an aerodynamic teardrop cross-sectional shape with a sharper leading edge 26 and a less sharp trailing edge 28. The cutting segment may alternatively be provided with an aerodynamic ellipse cross-sectional shape 29 with sharp leading and trailing edges. See FIG. 4.

It has been determined by experimentation that in a rotary cutting blade, the majority of the cutting is done at the tip zone. As such, the transition section 18 extending to the cutting segment 24 can be provided with a more efficient aerodynamic edge, thus reducing drag caused within this zone. Additionally, the transition section 18, with its blunt side 20 leading, may be pitched downward up to 10° or more to lift air, which in turn lifts grass for a better mowing cut quality. The greater mass transition section 18 (relative to the cutting segment 24 and/or the living hinge 16) adds stability to the line blade 10 during use. Blunt leading is less affected than sharp at an angle by forces created from air contact. Sharp is much more sensitive, but it cuts much better. Neutralizing the sharp edge dramatically reduces instability compared to a pitched sharp leading edge.

In an exemplary construction, the cutting segment 24 may be between 0.5-1.5 inches or possibly longer based on its speed and the cross-sectional shape used. Preferably, the cutting segment 24 is about one inch with a neutral aerodynamic orientation (angle of attack) for both sharp and blunt leading edges as evidenced by the reduction of drag measured by experimentation. By experimenting within the operating speed range and adding a neutral profile angle of attack at the cutting segment 24 (i.e., the blade tip), a length of about one inch (for a 14 inch cutting swath) achieved desirable results including substantially reduced flapping. Naturally, this length may vary as other variables are learned. The experimentation was repeated on various leading profile geometries with the same success.

Figure 5:
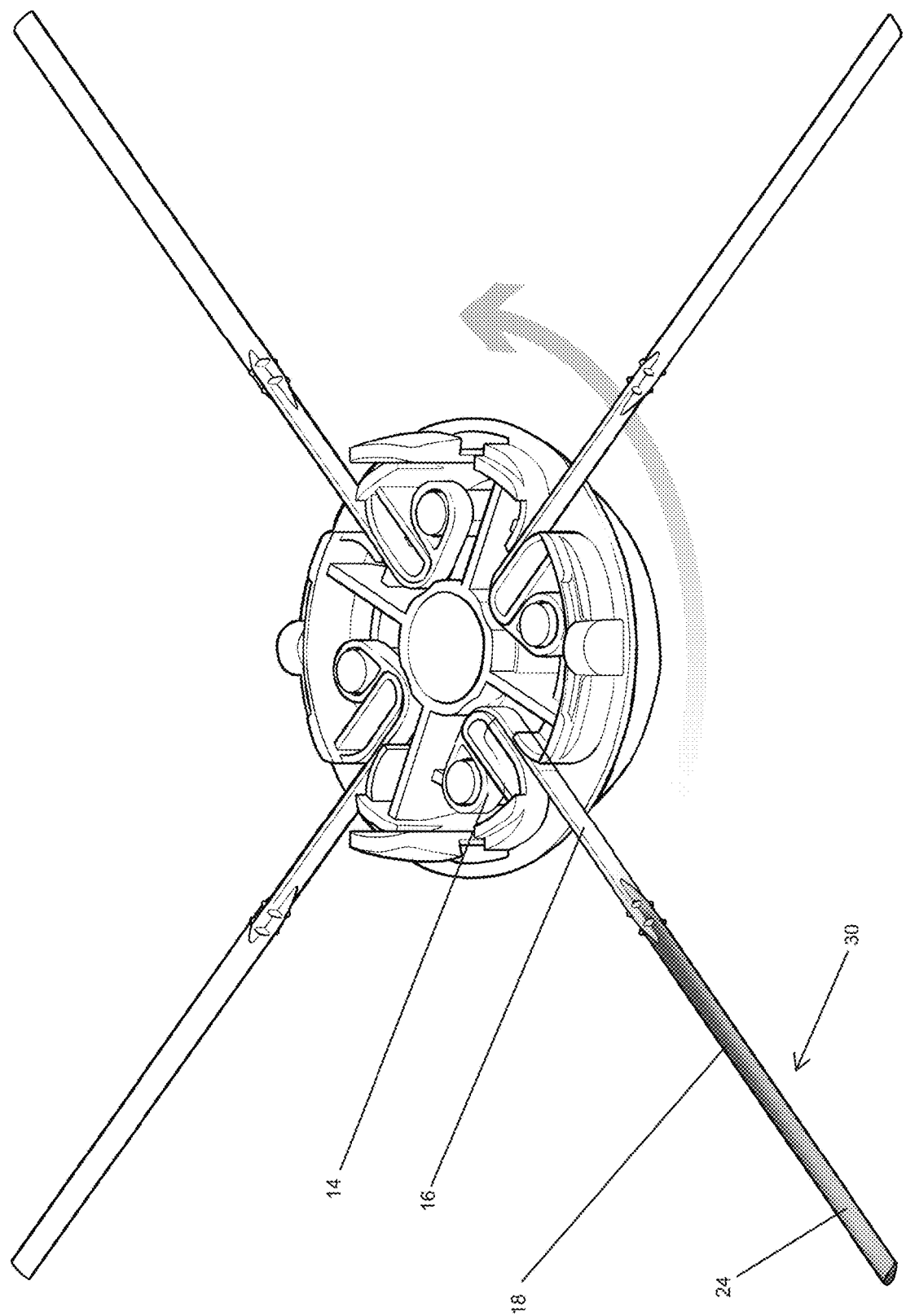
FIG. 5 shows the line blade including a parabolic or linear transition between the hinged section and the cutting segment.

FIG. 5 shows an alternative embodiment where the change 30 in cross-sectional shape between the cross-sectional shape of the transition section 18 and the cross-sectional shape of the cutting segment 24 is parabolic or linear. Linear is a constant 10° pitch, where parabolic could be a twisting variation in angle with radial extension of the transition section.

Line blades are manufactured in a single step from injection molding tools. High pressure specialized molten nylon is injected into a multi-cavity mold and allowed to cool. The mold is opened, and ejector pins push away the finished line blades.

To study and evaluate the many complicated and interacting factors, a design and development method was created utilizing the scientific drag formulae in conjunction with dynamometer drag measurements as a helpful guiding process to achieve lower drag results. With reference to FIG. 6, each segment exposed to air drag is governed by the relations shown and is optimized for function and performance. The flexible line blades according to the described embodiments can be manufactured from specially-selected polymers via a molding process, or optional alternate techniques of assembly for the associated segmental geometries.

Figure 7A:
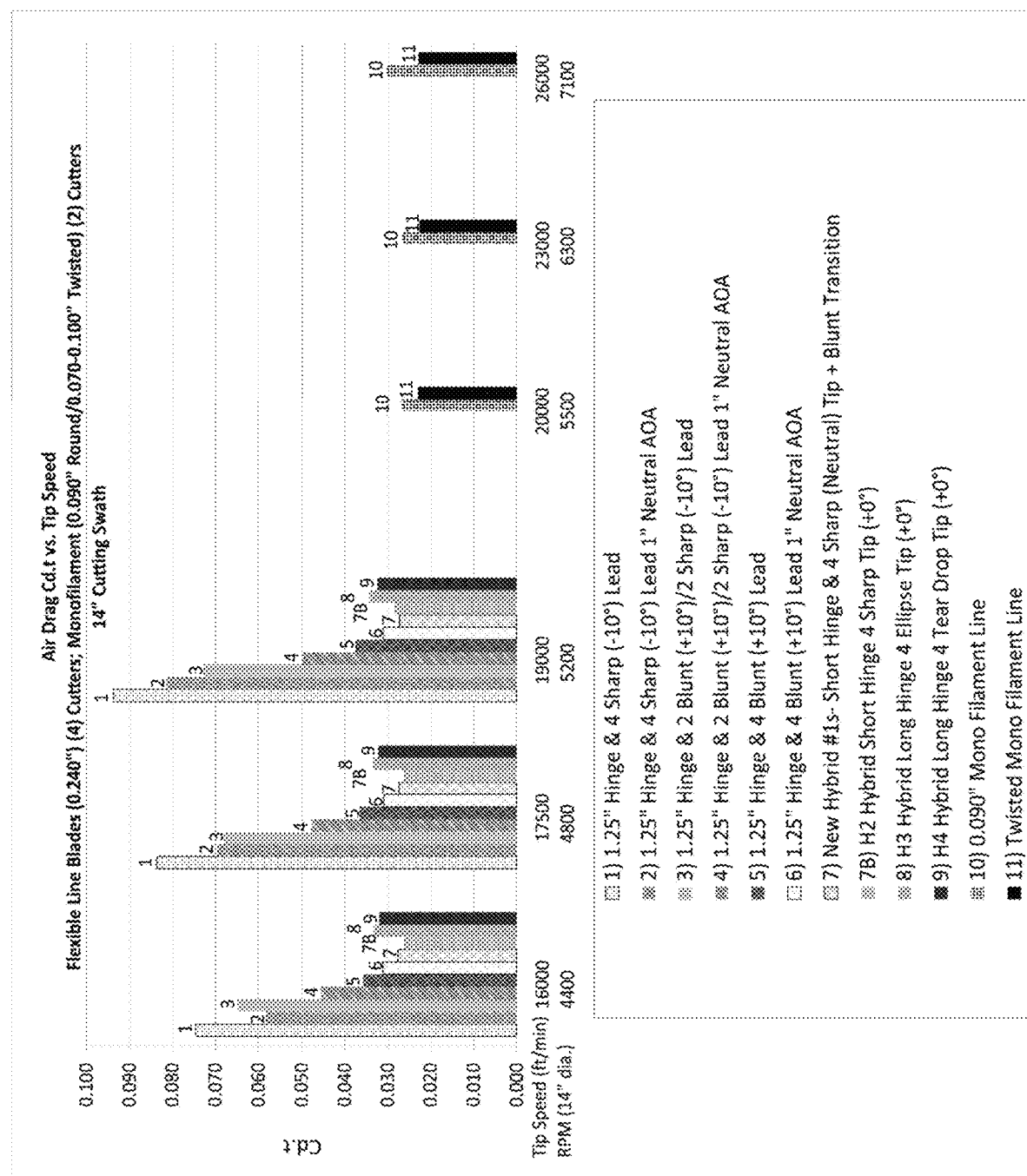
FIGS. 7A and 7B show performance data from dynamometer tests.
Figure 7B:
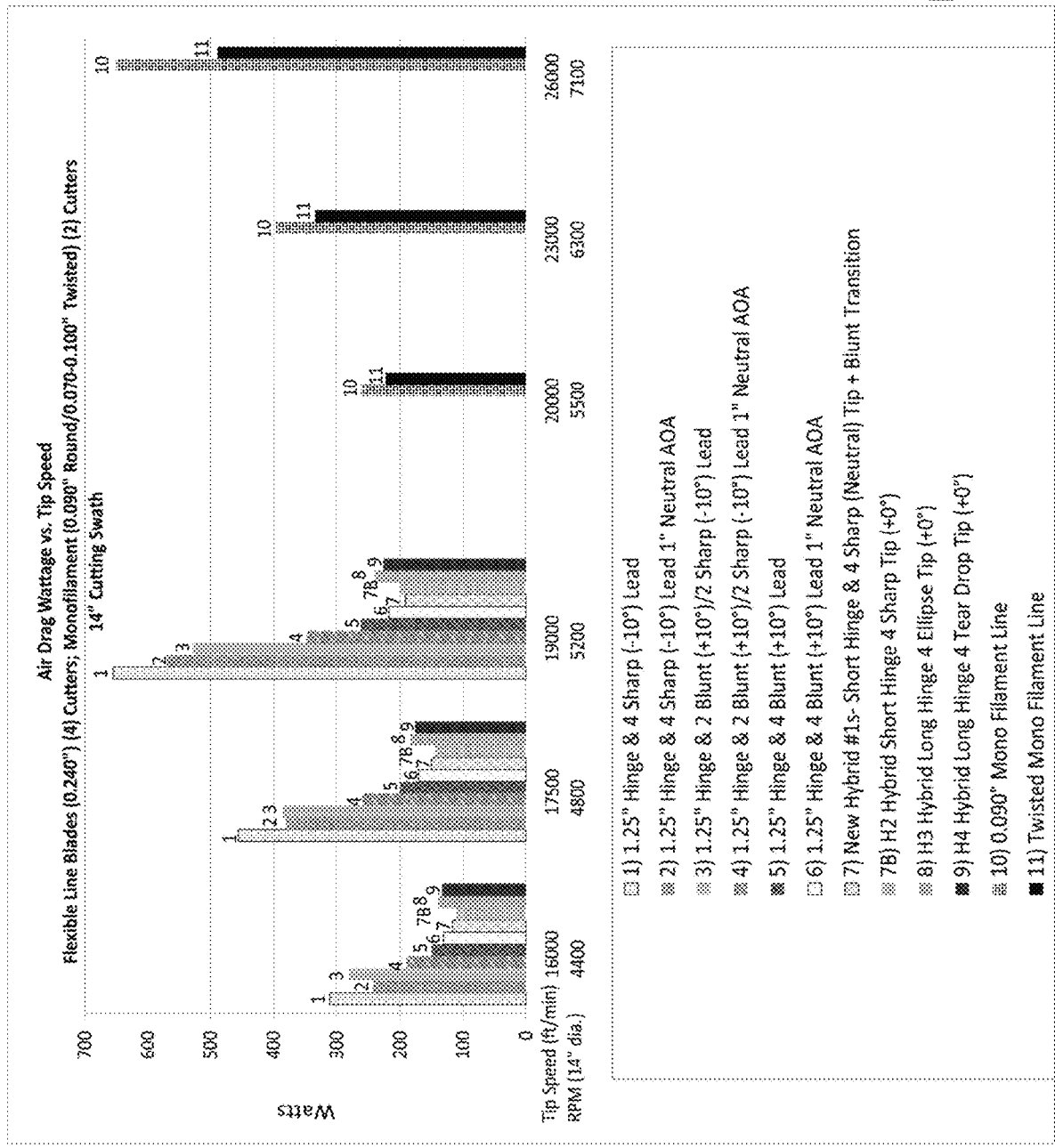

Referring to FIGS. 7A and 7B, a dynamometer was designed and fabricated to accurately measure the torque needed to drive any cutting line configuration, and to further calculate the Cd.t product. A relatively constant Cd.t value was noted for monofilament line as speed increases, which was known to run stable through the air in these speed ranges. It was noted that the more constant the Cd.t, the more stable the line blade would be observed in actual test. Further, the drag wattage dropped substantially when there is stability and reduced drag. Additionally, high speed cameras and other means (strobe lights, noise meters, anemometers, etc.) to observe and study the complex movements were employed as further aids. Using additional speed controls (variac) enables an rpm adjustment and refinement to view the presence or elimination of flapping or twist resonance.

Referring to FIG. 8, four popular trimmers (A, B, C and D) were individually tested in the field under actual grass cutting conditions with four of the described line blades at 4600 rpm (where monofilament lines are hardly capable of cutting, compared to two monofilament lines at the test trimmers' specified speeds. Using field meters to measure amps and volts, watts were calculated and recorded. Results showing lower wattage drag of more than 32% at the same speed for the B trimmer, which most other trimmers tested (A, C and D) experienced an operating wattage reduction of more than 50% compared to monofilament line. The cutting effectiveness improvement (faster rates, greater areas cut per charge, and improved quality) for the described line blade allows effective cutting at lower speeds, further reducing power requirements.

FIG. 9 shows field wattage data measured with a small 20V cordless (battery) trimmer for different types of trimming and mowing cuts, and when cutting at different levels of grass heights. Because it is nearly impossible for an operator to effectively control cutting height, the ground supporting glider in unison with the line blades of the described embodiments enable greater efficiency for the user to cut more on an elevated plane upward and within the grass growth area, and not into the roots of the plant. This prevents costly and high drag gouging into the ground, a primary cause of cordless trimmer inefficiencies of much higher wattage requirements.

Further means of reducing drag may be employed and tested such as special surface finishes, coatings, geometrical cross sections, for example.

Multiple line blade configurations were progressively tested to prove favorable trends toward lower drag, and the elimination of flapping was also observed by visualization studies during the trials. In one example, a Husqvarna® 325 gas trimmer was tested, measuring full throttle maximum rpm with four conventional Aero-Flex line blades and with four of the hybrid line blades according to the described embodiments. The 325 Husqvarna® engine carried the conventional (Echo® star 0.095") monofilament line to about 8200 rpm (their natural high drag loaded the engine). In contrast, the line blades according to the described embodiments reached speeds with less drag well beyond 13,000 rpm.

These tests, including actual grass cutting tests measuring power consumption, showed the effect of reducing drag (unloading) with the multi-zoned line blades according to the described embodiments. The power savings were enormous (40-60%), and the cutting quality and cutting rates were vastly improved. Operator fatigue factor can be dramatically reduced with the use of a free-wheeling glider disc (see, e.g., U.S. patent application Ser. Nos. 14/280,916, 14/955,196 and 15/221,017, the contents of which are hereby incorporated by reference) to relieve weight on the operator who can now better control height without digging into the ground. The hybrid line blades slice through even heavy grass with ease and less demand for power consumption and ugly gouging of the grass edges has been solved. Four different cordless trimmers were tested, and all had different configurations such as different high and low speed ranges, different cutting swaths, and different monofilament line sizes. These combinations are very effective at the very low speeds where at such speeds monofilament lines cannot effectively cut and where conventional line blades flap and resonate excessively.

Field power measuring meters were fabricated to measure watts under varied conditions such as motor only, air only, head rubbing on the ground, cutting line gouging into the ground, bumping drag losses, and cutting through 5-6" fescue grass. While there is a subjective potential for variation, including grass variables, the potential savings with the use of the line blades of the described embodiments became apparent.

When using a handheld trimmer, it is strenuous, and nearly impossible for the operator to control the height of cut. For these reasons, most trimmer operators will rest the trimmer on the ground during use. The rubbing friction of the head on the ground wastes valued power, and the vegetation trimming height are also low to the ground to result in gouging, scalping and unhealthy grass or the like that is also unsightly and of poor quality.

While professionals can control the cut height much better, the average user has difficulty. This process of gouging into the ground also wastes valued charge as the cutter lines scrape onto the ground. Cutting grass very low also takes added energy and will eventually kill the grass. However, when cutting with the line blades of the described embodiments along with a glider, the trimmer cuts the grass above the root stems, thus maintaining a healthier grass plant.

Gas trimmers have unlimited power with high energy fuels, but battery trimmers are energy starved. For years, trimming with gas trimmers has not been an energy issue. However, with cordless trimmers, energy consumption and associated waste is now paramount. The substantial improvements achieved by the line blade of the described embodiments will significantly benefit gas trimmers, but are, moreover, particularly focused toward achieving major flexible line blade technology improvements for cordless battery-powered trimmers. With the subject innovations of sharper cutting, very low drag hybrid line blade designs, possibly also coupled with the ground supporting glider disc, a redesigned trimmer can achieve enormous savings as measured in watts during cutting tests with several popular cordless trimmers.

The line blades according to the described embodiments add at least a fourth newly defined segment zone at the outermost cutting end of the flexible line blade with a sharp leading edge and a neutral angle of attack (AOA) segment. The design reduces or nearly eliminates active forces that cause line blade 'flutter,' while also reducing drag, preventing high frequency resonant twist, and improving cut quality. Experimentation suggests finding the 'sweet spot' of the most efficient ratios of lengths between zones/segments. Other trimmer benefits include power savings with less drag and more efficient cutting with sharper edges, and changing the current sharp leading edge of the 'transition' zone (between the hinge and the cutting segment) to a leading edge with an aerodynamic (e.g., teardrop) cross section reduces even more drag and noise, yet still draws air upward which, in turn, lifts and stiffens grass to improve cutting quality. The design further reduces noise levels by reducing high frequency blade twisting, reduces amperage loads and annoying breaker spiking thereby reducing wasted energy, and thus reducing cost and weight of bigger batteries. The design improves cutting performance by mowing more evenly without flapping interference and reduces the hinge area of exposure to both air and grass drag resistance, which further reduces drag.

Providing all these specific improvements in combination results in more desirable, greatly improved and much higher performing flexible cutting line blades that will improve performance and value for gas trimmers, while being particularly beneficial to cordless trimmers.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A line blade for a rotating trimmer, the line blade comprising:
a loading section configured to be securable for rotation with a head of the rotating trimmer;
a living hinge extending from the loading section in an upright orientation with the line blade in an upright profile;
a transition section extending from the living hinge and having a first cross-sectional shape, the transition section, with the line blade in the upright profile, being oriented such that a height of the transition section is less than a width of the transition section, the first cross-sectional shape spanning a majority of the length of the line blade and comprising an aerodynamic cross-section with a blunt leading edge and a trailing edge sharper than the blunt leading edge; and a cutting segment extending from the transition section, the cutting segment having a second cross-sectional shape that is different from the first cross-sectional shape.

2. A line blade according to claim 1, wherein the upright orientation of the living hinge defines a third cross-sectional shape that is different from the first and second cross-sectional shapes.

3. A line blade according to claim 1, wherein the aerodynamic cross-section is pitched from the blunt leading edge to the sharper trailing edge to create an updraft when the line blade is rotated by the rotating trimmer.

4. A line blade according to claim 1, wherein the second cross-sectional shape is elliptical.

5. A line blade according to claim 1, wherein the second cross-sectional shape comprises a sharp leading cutting edge.

6. A line blade according to claim 5, wherein the transition section has a greater mass than the cutting segment.

7. A line blade according to claim 1, wherein the transition section has a greater mass than the cutting segment.

8. A line blade according to claim 1, wherein the cutting segment comprises a neutral profile angle relative to a cutting plane.

9. A line blade for a rotating trimmer, the line blade comprising:
   a loading section configured to be securable for rotation with a head of the rotating trimmer;
   a living hinge extending from the loading section in an upright orientation with the line blade in an upright profile;
   a transition section extending from the living hinge and having a first cross-sectional shape, the transition section, with the line blade in the upright profile, being oriented such that a height of the transition section is less than a width of the transition section; and
   a cutting segment extending from the transition section, the cutting segment having a second cross-sectional shape that is different from the first cross-sectional shape, wherein the first cross-sectional shape comprises an aerodynamic cross-section with a blunt leading edge and a trailing edge sharper than the blunt leading edge, and wherein the second cross-sectional shape comprises a sharp cutting leading edge.

10. A line blade according to claim 9, wherein the cutting segment is 0.5-1.5" in length.

11. A line blade according to claim 10, wherein the cutting segment is about 1" in length.

12. A line blade according to claim 9, wherein the transition section has a greater mass than the cutting segment.

13. A line blade for a rotating trimmer, the line blade comprising:
    a loading section configured to be securable for rotation with a head of the rotating trimmer;
    a living hinge extending from the loading section;
    a transition section extending from the living hinge and having a first cross-sectional shape; and
    a cutting segment extending from the transition section, the cutting segment having a second cross-sectional shape that is different from the first cross-sectional shape, the second cross-sectional shape being configured and oriented for cutting vegetation,
    wherein the first cross-sectional shape is an aerodynamic cross-section with a blunt leading edge and a trailing edge sharper than the blunt leading edge, and wherein the second cross-sectional shape comprises a sharp cutting leading edge.

14. A line blade according to claim 13, wherein an upright orientation of the living hinge defines a third cross-sectional shape that is different from the first and second cross-sectional shapes.

15. A line blade according to claim 13, wherein the aerodynamic cross-section is pitched from the blunt leading edge to the sharper trailing edge to create an updraft when the line blade is rotated by the rotating trimmer.

16. A line blade according to claim 13, wherein the cutting segment comprises a neutral profile angle relative to a cutting plane.

* * * * *